(12) United States Patent
Jeromin

(10) Patent No.: US 11,827,157 B2
(45) Date of Patent: Nov. 28, 2023

(54) VEHICLE CAMERA MOUNTING ASSEMBLY

(71) Applicant: Rivian IP Holdings, LLC, Plymouth, MI (US)

(72) Inventor: Oliver Jeromin, Bloomfield Hills, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/104,018

(22) Filed: Nov. 25, 2020

(65) Prior Publication Data

US 2022/0161738 A1 May 26, 2022

(51) Int. Cl.
*B60H 1/34* (2006.01)
*B60K 37/00* (2006.01)
*B60R 11/04* (2006.01)
*B60R 11/00* (2006.01)

(52) U.S. Cl.
CPC ....... *B60R 11/04* (2013.01); *B60R 2011/0005* (2013.01); *B60R 2011/0026* (2013.01)

(58) Field of Classification Search
CPC ............. B60R 11/04; B60R 2011/0005; B60R 2011/0026; B60H 1/34; B60K 37/00
See application file for complete search history.

(56) References Cited

U.S. PATENT DOCUMENTS 5,096,287 A * 3/1992 Kakinami .................. B60R 1/12
352/132
6,170,955 B1 * 1/2001 Campbell ............... B60R 11/04
248/208
9,834,154 B2 * 12/2017 Carson .................... B60R 11/04
2016/0167595 A1 * 6/2016 Kang .................... H04N 5/2252
348/148

FOREIGN PATENT DOCUMENTS

| DE | 102011008969 A1 | 7/2012 | |
|---|---|---|---|
| DE | 112018002106 T5 | 1/2020 | |
| DE | 102019209132 B4 * | 12/2020 | ............. B60R 11/04 |
| JP | 2001250198 A | 9/2001 | |
| JP | 2019116237 A * | 7/2019 | |

OTHER PUBLICATIONS

Nov. 16, 2022 Office Action issued in Corresponding DE Application No. 10 2021 209 271.3.

* cited by examiner

*Primary Examiner* — Patrick E Demosky
(74) *Attorney, Agent, or Firm* — Clements Bernard Walker; Christopher L. Bernard

(57) ABSTRACT

A vehicle camera arrangement, including: a camera mounting assembly coupled to a structure of a vehicle adjacent to a lower portion of a windshield of the vehicle; and a camera assembly coupled to the camera mounting assembly having visibility through the lower portion of the windshield of the vehicle. The structure of the vehicle is associated with a dashboard of the vehicle. The camera mounting assembly includes a sealing member disposed between a front portion thereof and the lower portion of the windshield of the vehicle. The vehicle camera arrangement further includes an air duct adapted to deliver an air flow to a front portion of the camera mounting assembly and the camera assembly through the structure of the vehicle.

17 Claims, 3 Drawing Sheets

VEHICLE CAMERA MOUNTING ASSEMBLY

TECHNICAL FIELD

The present disclosure relates generally to the automotive field. More particularly, the present disclosure relates to a vehicle camera mounting assembly suitable for use in a vehicle with advanced driver assistance system (ADAS) and/or autonomous driving (AD) functionalities.

BACKGROUND

Vehicles with ADAS and/or AD functionalities often utilize a camera assembly that is mounted on the windshield, typically in front of the rear view mirror, such that the camera assembly is hidden from the driver or operator. This camera assembly is mounted near the top of the windshield, within the reach of the windshield wipers, such that the camera's view of the environment may be kept as clean and unobstructed as possible. The associated mounting assembly typically includes a bracket that is glued or otherwise affixed to the windshield and holds the camera. However, in commercial vehicles, for example, the windshield wipers may not fully reach the top of the windshield and the camera assembly, and a rear view mirror may not be utilized. As a result, the camera's view of the environment may be obscured in inclement weather, and the camera assembly may not be adequately hidden from the driver or operator. Thus, the driver or operator may be tempted to tamper or interfere with the camera assembly, raising potential safety issues. The use of a bracket that is glued or otherwise affixed to the lower portion of the windshield is not common, as commercial vehicle windshields may be large, and this lower portion may be blocked by the large dashboard used. Further, there are no effective means for circulating climate control air to such low mounted camera assemblies, leading to temperature and condensation control problems that affect the camera's operation and vision.

The present background is provided as illustrative environment and context only and should not be construed as limiting in any manner. As will be apparent to those of ordinary skill in the art, the principles of the present disclosure may be implemented in other environments and contexts equally.

SUMMARY

The present disclosure provides a camera mounting assembly that receives and retains a camera and that is attached to the cowl or other body structure of a vehicle, over which the dashboard is disposed. A cover structure is provided, integrated with or separate from the dashboard, that is disposed over this camera mounting assembly, hiding the camera assembly from the driver or operator. The cover structure may be formed as part of the valence panel of the top of the dashboard, for example. The camera mounting assembly is thus disposed near the bottom of the windshield of the vehicle, within the reach of the windshield wipers, such that the camera's view of the environment may be maintained in inclement weather. A seal is provided between the camera mounting assembly and/or cover structure and the windshield, thereby protecting the area around the camera from collecting dirt and debris and ensuring proper air flow across the windshield to reduce condensation that could impair camera visibility. A shroud is also provided around the camera that reduces the amount of stray light entering the camera imaging space and creating "ghost objects" in the images that the camera captures. Alternatively, a light absorbing material (e.g., flock tape) can be affixed to the camera mounting assembly for this purpose. No separate bracket glued or otherwise affixed to the windshield is required. The camera mounting assembly and the camera are in fluid communication with an air flow channel that is disposed through the cowl or other body structure of the vehicle, providing air flow and convection through the camera mounting assembly and to the camera, preventing temperature and condensation control problems that affect the camera's operation and vision.

In one illustrative embodiment, the present disclosure provides a vehicle camera arrangement, including: a camera mounting assembly coupled to a structure of a vehicle adjacent to a lower portion of a windshield of the vehicle; and a camera assembly coupled to the camera mounting assembly having visibility through the lower portion of the windshield of the vehicle. The structure of the vehicle is associated with a dashboard of the vehicle. Optionally, the camera mounting assembly includes a cover structure that is disposed through a valence panel of the dashboard of the vehicle. Alternatively, the camera mounting assembly includes a cover structure that is integrally formed with a valence panel of the dashboard of the vehicle. The camera mounting assembly includes a sealing member disposed between a front portion thereof and the lower portion of the windshield of the vehicle. The vehicle camera arrangement further includes an air duct adapted to deliver an air flow to a front portion of the camera mounting assembly and the camera assembly through the structure of the vehicle. Optionally, the air duct is coupled to another air duct adapted to deliver another air flow adjacent to the camera mounting assembly and the camera assembly opposite the lower portion of the windshield of the vehicle. The camera mounting assembly includes a top member, a bottom member, and a pair of side spanning members collectively disposed about the camera assembly.

In another illustrative embodiment, the present disclosure provides a vehicle camera arrangement method, including: coupling a camera mounting assembly to a structure of a vehicle adjacent to a lower portion of a windshield of the vehicle; and coupling a camera assembly to the camera mounting assembly providing camera visibility through the lower portion of the windshield of the vehicle. The structure of the vehicle is associated with a dashboard of the vehicle. Optionally, the camera mounting assembly includes a cover structure that is disposed through a valence panel of the dashboard of the vehicle. Alternatively, the camera mounting assembly includes a cover structure that is integrally formed with a valence panel of the dashboard of the vehicle. The camera mounting assembly includes a sealing member disposed between a front portion thereof and the lower portion of the windshield of the vehicle, the method further including affixing the sealing member to the lower portion of the windshield of the vehicle. The method further includes coupling an air duct to a front portion of the camera mounting assembly and the camera assembly through the structure of the vehicle to deliver an air flow to the front portion of the camera mounting assembly and the camera assembly through the structure of the vehicle. Optionally, the air duct is coupled to another air duct adapted to deliver another air flow adjacent to the camera mounting assembly and the camera assembly opposite the lower portion of the windshield of the vehicle. The camera mounting assembly includes a top member, a bottom member, and a pair of side spanning members collectively disposed about the camera assembly.

In a further illustrative embodiment, the present disclosure provides a vehicle camera mounting assembly, including: a top member; a bottom member adapted to be coupled to a structure of a vehicle adjacent to a lower portion of a windshield of the vehicle; and a pair of side spanning members disposed between the top member and the bottom member; wherein the top member, the bottom member, and the pair of side spanning members are collectively adapted to receive a camera assembly there between and provide the camera assembly with visibility through the lower portion of the windshield of the vehicle. The camera mounting assembly further includes a cover structure that is one of disposed through a valence panel of a dashboard of the vehicle and integrally formed with the valence panel of the dashboard of the vehicle. The camera mounting assembly further includes a sealing member coupled to a front portion of the top member and the bottom member and adapted to engage the lower portion of the windshield of the vehicle. The camera mounting further includes a front plate cover defining a port adapted to receive an air duct adapted to deliver an air flow to a front portion of the camera mounting assembly and the camera assembly through the structure of the vehicle.

BRIEF DESCRIPTION OF THE DRAWINGS

The present disclosure is illustrated and described herein with reference to the various drawings, in which like reference numbers are used to denote like assembly components/method steps, as appropriate, and in which.

DETAILED DESCRIPTION

The present disclosure provides a camera mounting assembly that receives and retains a camera, such as a front facing camera, and that is attached to the cowl or other body structure of a vehicle, over which the dashboard is disposed. A cover structure is provided, integrated with or separate from the dashboard, that is disposed over this camera mounting assembly, hiding the camera assembly from the driver or operator. The cover structure may be formed as part of the valence panel of the top of the dashboard. The camera mounting assembly is thus disposed near the bottom of the windshield of the vehicle, within the reach of the windshield wipers, such that the camera's view of the environment may be maintained in inclement weather. This is especially helpful in commercial vehicles that utilize a large, substantially vertical windshield with limited windshield wiper reach. A seal is provided between the camera mounting assembly and/or cover structure and the windshield, thereby protecting the area around the camera from collecting dirt and debris and ensuring proper air flow across the windshield to reduce condensation that could impair camera visibility. A shroud is also provided around the camera that reduces the amount of stray light entering the camera imaging space and creating "ghost objects" in the images that the camera captures. Alternatively, a light absorbing material (e.g., flock tape) can be affixed to the camera mounting assembly for this purpose. No separate bracket glued or otherwise affixed to the windshield is required. The camera mounting assembly and the camera are in fluid communication with an air flow channel that is disposed through the cowl or other body structure of the vehicle, providing air flow and convection through the camera mounting assembly and to the camera, preventing temperature and condensation control problems that affect the camera's operation and vision. It will be readily apparent to those of ordinary skill in the art that the camera of the present disclosure may be replaced or supplemented by any other type of perception sensor as well, such as a radar sensor, a lidar sensor, etc., and/or any other type of sensor, such as a light sensor, a rain sensor, etc.

Figure 1:
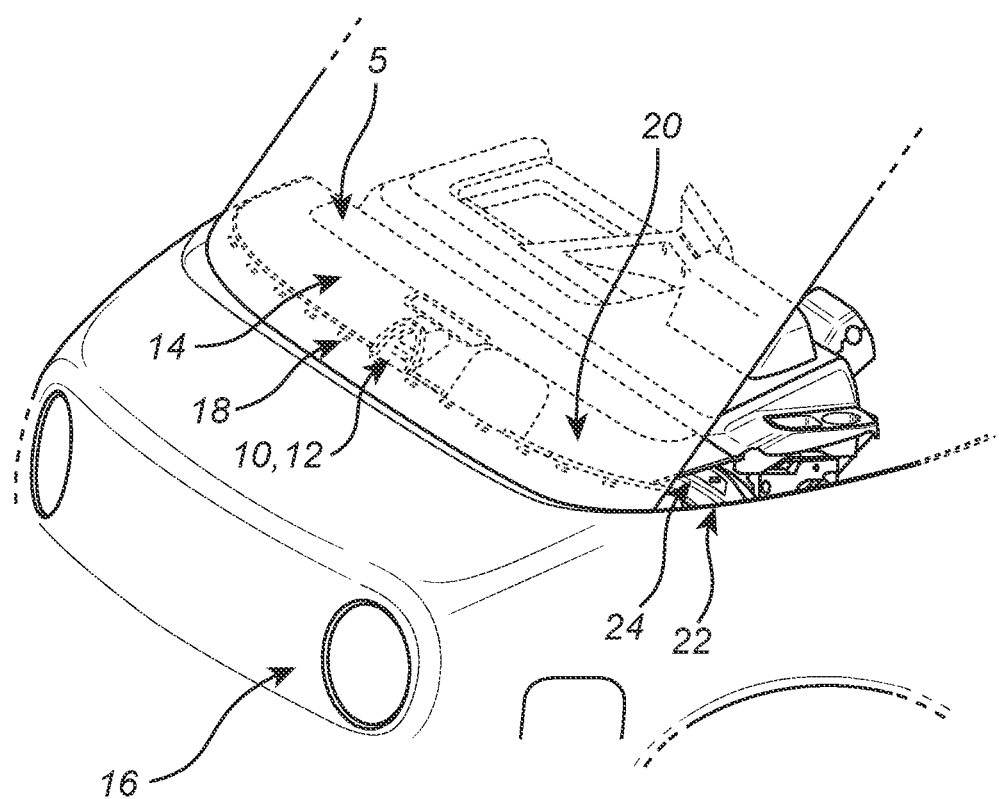
FIG. 1 is a perspective view of one illustrative embodiment of the camera mounting assembly and camera assembly of the present disclosure installed proximate the lower portion of the windshield of a vehicle.

Referring now specifically to FIG. 1, in one illustrative embodiment, the vehicle camera arrangement 5 of the present disclosure includes a camera mounting assembly 10 and a camera assembly 12. The camera mounting assembly 10 and camera assembly 12 of the present disclosure are disposed behind the windshield 14 of a vehicle 16 in the bottom portion 18 of the windshield 14. This is not a typical location as the bottom portion 18 of the windshield 14 is typically obstructed by the dashboard 20 of the vehicle 16, especially in a commercial vehicle, or otherwise obstructs the field of view of the driver or operator of the vehicle 16 or exposes the camera mounting assembly 10 and camera assembly 12 to tampering or interference by the driver or operator of the vehicle, potentially compromising camera operation and vehicle safety. In the embodiment illustrated, the camera mounting assembly 10 and camera assembly 12 are disposed near the center of the windshield 14, although a location to either side may also be used, as may multiple camera mounting assemblies 10 and camera assemblies 12. The camera mounting assembly 10 is primarily secured to the cowl or other structure 22 of the vehicle 16 behind the windshield 14, where the cowl or other structure 22 forms part of the dashboard 20, is disposed beneath a valence panel 24 of the dashboard 20, etc. The camera mounting assembly 10 may be secondarily secured to the windshield 14, as is described in greater detail herein below, but this is not required. Of note, the positioning of the camera mounting assembly 10 and camera assembly 12 in the bottom portion 18 of the windshield 14 allows the windshield wipers (not illustrated) to clear the line of sight of the camera assembly 12 when activated, as the windshield wipers generally cover/reach the bottom portion 18 of the windshield 14.

Figure 2:
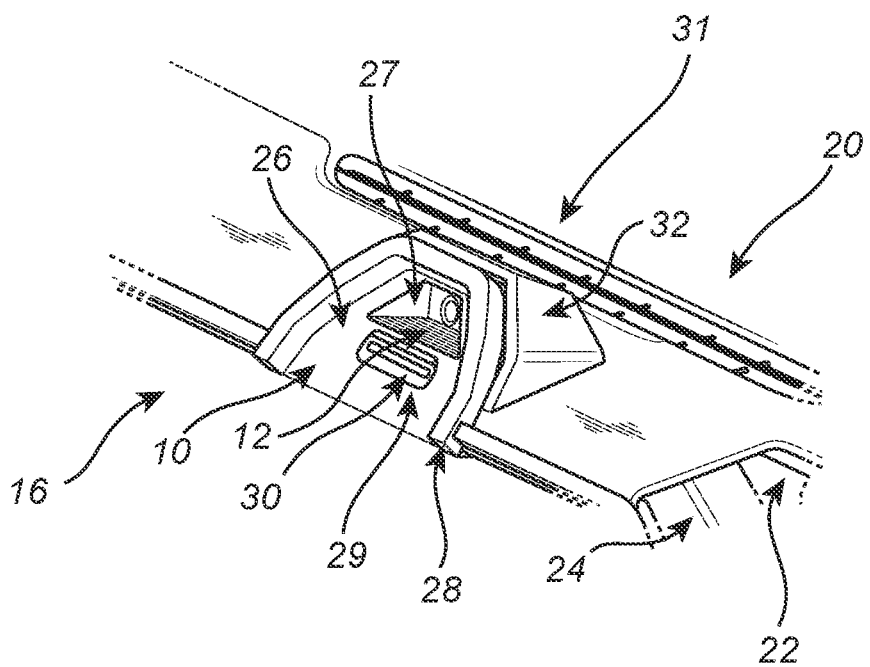
FIG. 2 is another perspective view of the camera mounting assembly and camera assembly of FIG. 1 installed proximate the lower portion of the windshield of the vehicle, highlighting the associated dashboard valence cover structure.

Referring now specifically to FIG. 2, the camera mounting assembly 10 includes a front cover plate 26 that faces the windshield 14 (FIG. 1) and hides the other structures of the camera mounting assembly 10 and camera assembly 12 from view through the windshield 14. The front cover plate 26 defines a shroud 27 through which the camera assembly 12 has a view of the environment in front of the vehicle 16. This shroud 27 includes a stepped or corrugated surface that reduces the amount of stray light entering the camera imaging space and creating "ghost objects" in the images that the camera assembly 12 captures. Alternatively, a light absorbing material (e.g., flock tape) can be affixed to a port of the camera mounting assembly 10 disposed about the camera assembly 12 for this purpose. A sealing member 28 is provided around the whole or partial outer periphery of the front cover plate 26 and serves to abut the windshield 14, thereby partially sealing the camera compartment 29 formed by the camera mounting assembly 10 from intrusion by dust, debris, and the like and directing defrost air flow and the like to the windshield 14 in front of the camera assembly 12. The front cover plate 26 may be manufactured from a substantially rigid material, such as a metal or a plastic, while the sealing member 28 may be manufactured from the same substantially rigid material or from a more flexible material, such as a rubber or a foam. The sealing member 28 is glued or otherwise affixed to the camera mounting assembly 10. Optionally, the sealing member 28 is also glued or otherwise affixed to the windshield 14, although this is not necessary and a simple abutment interface may be provided. In any case, the sealing member 28 serves to partially seal the camera compartment 29 formed by the camera mounting assembly 10 from intrusion by dust, debris, and the like and direct defrost air flow and the like to the windshield 14 in front of the camera assembly 12. The shroud 27 serves to diminish stray light entering the camera compartment 29 and creating "ghost objects" in the images that the camera assembly 12 captures.

An air duct 30 is vented through the front cover plate 26 of the camera mounting assembly 10, providing air flow and convection through the camera mounting assembly 10 and to the camera assembly 12, preventing temperature and condensation control problems that affect the camera assembly's operation and vision. This air duct 30 may form part of the existing defrost and/or climate control duct system of the vehicle 16 or may be a dedicated duct specifically routed to affect the camera assembly 12. The air duct 30 may be disposed anywhere within the camera compartment 29, but is shown directing air towards the windshield 14 in front of the camera assembly 12. Here, a conventional defrost and/or climate control vent 31 is shown disposed adjacent to the camera mounting assembly 10 and camera assembly 12, opposite the windshield 14.

Behind the windshield 14, the camera mounting assembly 10 and camera assembly 12 are covered by a cover structure 32. This cover structure 32 may form a portion of the valence panel 24 of the dashboard 20 or may protrude through the valence panel 24. Thus, the cover structure 32 may be manufactured from a substantially rigid material, such as a plastic, or may be manufactured from the same material as the valence panel 24. The cover structure 32 prevents to tampering or interference with the camera assembly 12 by the driver or operator of the vehicle 16, potentially compromising camera operation and vehicle safety. The cover structure 32 may be vented as desired.

Referring now specifically to FIG. 3, again, the camera mounting assembly 10 includes the front cover plate 26 that faces the windshield 14 (FIG. 1) and hides the other structures of the camera mounting assembly 10 and camera assembly 12 from view through the windshield 14. The front cover plate 26 defines the port 27 through which the camera assembly 12 has a view of the environment in front of the vehicle 16. This port 27 may have any suitable, and may include multiple visibility openings. Here, a U-shaped sealing member 28 is provided around the partial outer periphery of the front cover plate 26 and serves to abut the windshield 14, thereby partially sealing the camera compartment 29 formed by the camera mounting assembly 10 from intrusion by dust, debris, and the like. The sealing member 28 may be manufactured from a substantially rigid material, such as a metal or a plastic, or from a more flexible material, such as a rubber or a foam. The sealing member 28 is glued or otherwise affixed to the camera mounting assembly 10. Optionally, the sealing member 28 is also glued or otherwise affixed to the windshield 14, although this is not necessary and a simple abutment interface may be provided. In any case, the sealing member 28 serves to partially seal the camera compartment 29 formed by the camera mounting assembly 10 from intrusion by dust, debris, and the like and direct defrost air flow and the like to the windshield 14 in front of the camera assembly 12. The shroud 27 serves to diminish stray light entering the camera compartment 29 and creating "ghost objects" in the images that the camera assembly 12 captures. One or more adjacent brackets and/or sealing members 34 may be provided to also span the gap between the dashboard 20 (FIG. 1) and the windshield 14.

The air duct 30 is vented through the front cover plate 26 of the camera mounting assembly 10, providing air flow and convection through the camera mounting assembly 10 and to the camera assembly 12, preventing temperature and condensation control problems that affect the camera assembly's operation and vision. Again, this air duct 30 may form part of the existing defrost and/or climate control duct system of the vehicle 16 or may be a dedicated duct specifically routed to affect the camera assembly 12. The air duct 30 may be disposed anywhere within the camera compartment 29, but is shown directing air upwards and outwards towards the windshield 14 in front of the camera assembly 12. The conventional defrost and/or climate control vent 31 is shown disposed adjacent to the camera mounting assembly 10 and camera assembly 12, opposite the windshield 14.

Figure 3:
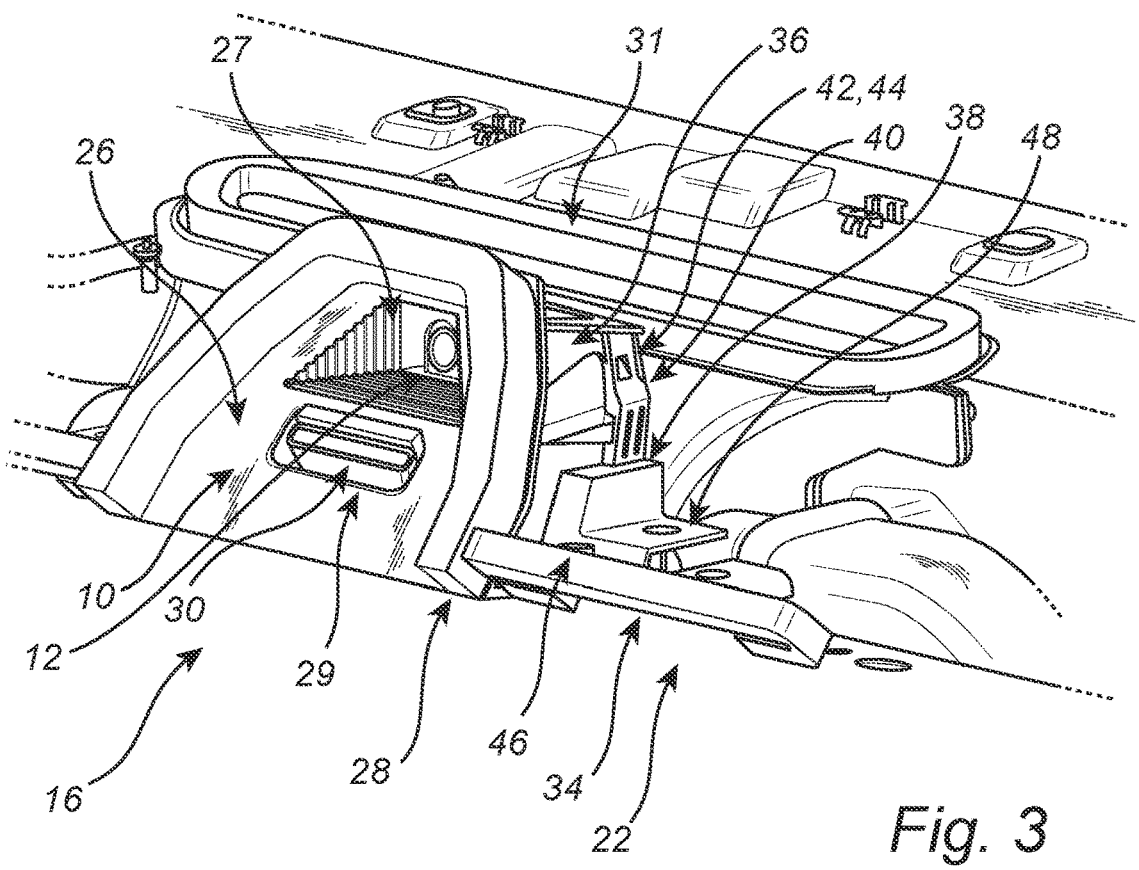
FIG. 3 is a further perspective view of the camera mounting assembly and camera assembly of FIG. 1 installed proximate the lower portion of the windshield of the vehicle, highlighting the associated shroud seal and air circulation duct.

In FIG. 3, the structure of the camera mounting assembly 10 itself may be seen in greater detail. Behind the front cover plate 26, the camera mounting assembly 10 includes a top member 36 and a bottom member 38 between which the camera assembly 12 is disposed and secured. The top member 36 and the bottom member 38 are coupled together via a pair of side spanning members 40 that optionally allow for a degree of vertical displacement between the two components, such that the top member 36 may be displaced with respect to the bottom member 38 while the camera assembly 12 is disposed between the two components. Here, the camera assembly 12 includes a protrusion 42 that is adapted to engage a corresponding notch 44 manufactured into each of the spanning members 40, thereby securing the camera assembly 12 in position relative to the camera mounting assembly 10. It will be readily apparent to those of ordinary skill in the art that other camera mounting assembly-camera assembly interfaces may be used equally, including simple screw interfaces, slot interfaces, conformal interfaces, etc. The bottom member 38 of the camera mounting assembly 10 is secured to the cowl or other structure 22 of the vehicle 16 via a pair of bolts 46 or the like. Optionally, the bottom member 38 of the camera mounting assembly 10 also includes one or more holes or apertures 48 for receiving and securing the cover structure 32 (FIG. 2) and/or valence panel 24 (FIGS. 1 and 2) of the dashboard 20 (FIGS. 1 and 2).

Figure 4:
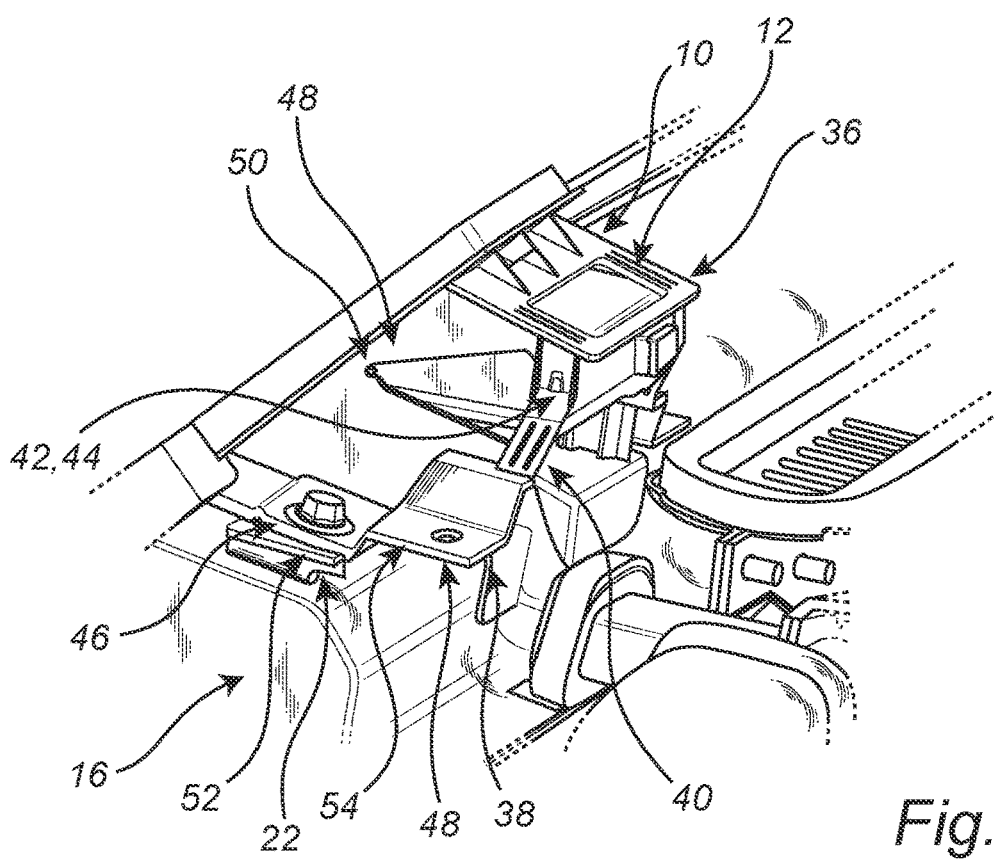
FIG. 4 is a still further perspective view of the camera mounting assembly and camera assembly of FIG. 1 installed proximate the lower portion of the windshield of the vehicle, highlighting the associated camera assembly retention structure(s)

Referring now specifically to FIG. 4, the structure of the camera mounting assembly 10 itself may be seen in even greater detail. Again, behind the front cover plate 26, the camera mounting assembly 10 includes the top member 36 and the bottom member 38 between which the camera assembly 12 is disposed and secured. The top member 36 and the bottom member 38 are coupled together via the pair of side spanning members 40 that optionally allow for a degree of vertical displacement between the two components, such that the top member 36 may be displaced with respect to the bottom member 38 while the camera assembly 12 is disposed between the two components. This degree of displacement may be provided by a pair of relief joints 48 provided near the juncture of the top member 36 and the bottom member 38. Here, the camera assembly 12 includes a pair of front pegs 50 that are configured to engage these relief joints 48, thereby further securing the camera assembly 12 to the camera mounting assembly 10. Again, the camera assembly 12 includes a pair of protrusions 42 that are adapted to engage a corresponding pair of notches 44 manufactured into the spanning members 40, thereby securing the camera assembly 12 in position relative to the camera mounting assembly 10. It will again be readily apparent to those of ordinary skill in the art that other camera mounting assembly-camera assembly interfaces may be used equally, including simple screw interfaces, slot interfaces, conformal interfaces, etc. The bottom member 38 of the camera mounting assembly 10 is secured to the cowl or other structure 22 of the vehicle 16 via the pair of bolts 46 or the like and the bottom member 38 of the camera mounting assembly 10 includes one or more holes or apertures 48 for receiving and securing the cover structure 32 (FIG. 2) and/or valence panel 24 (FIGS. 1 and 2) of the dashboard 20 (FIGS. 1 and 2). The bolts 46 engage a first pair of flanges 52 coupled to the bottom member 38 and the holes or apertures 48 are formed in a second pair of flanges 54 coupled to the bottom member 38. These flanges 52 and 54 may be separate, coupled, or coincident, as desired.

It should be noted that the camera mounting assembly 10 may consist of a simple frame structure that is designed to secure the camera assembly 12 to the cowl or other structure 22 of the vehicle 16 in the desired location, and beneath or adjacent to the valence panel 24 of the dashboard 20 of the vehicle, provided that the appropriate ventilation is also provided.

Figure 5:
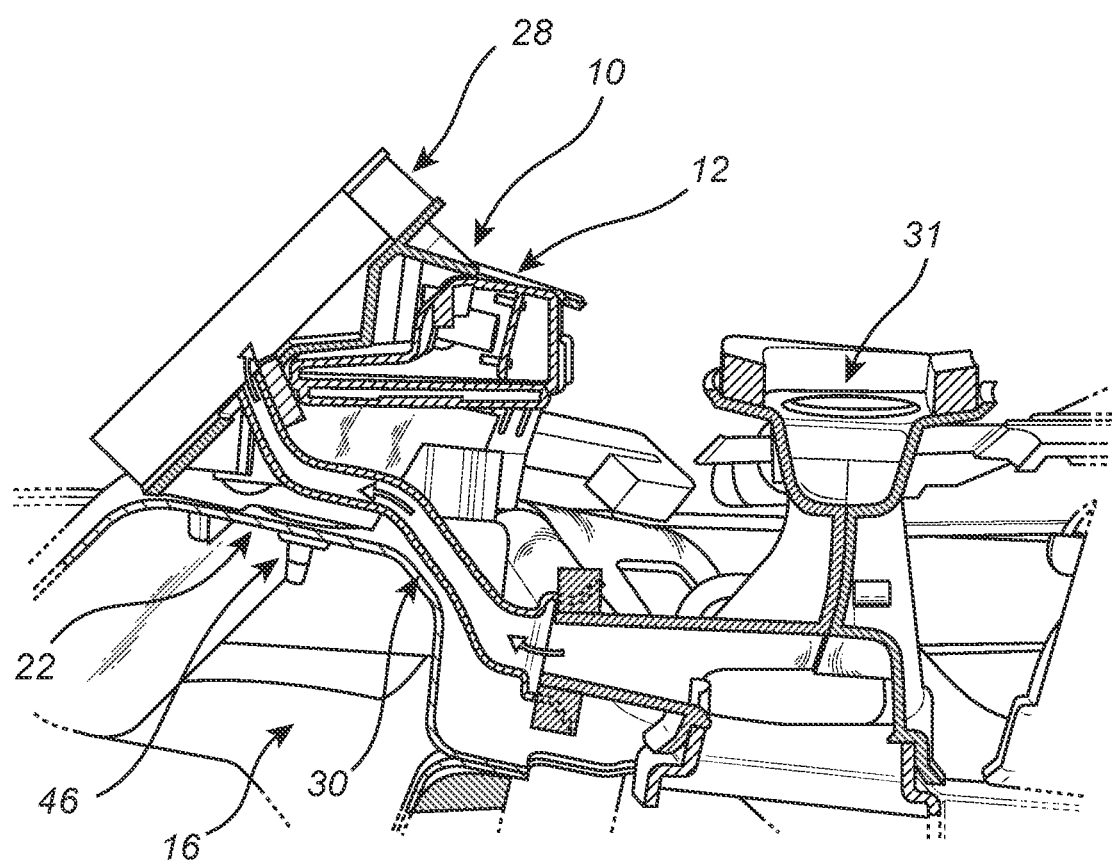
FIG. 5 is a side planar view of the camera mounting assembly and camera assembly of FIG. 1 installed proximate the lower portion of the windshield of the vehicle, highlighting the associated air circulation duct.

Referring now specifically to FIG. 5, the attachment of the camera mounting assembly 10 and camera assembly to the cowl or other structure 22 of the vehicle 16 via the pair of bolts 46 is illustrated, as is the sealing member 28. It can be seen that the air duct 30 associated with the camera mounting assembly 30 is formed as a branch of the defrost and/or climate control vent 31 that is disposed adjacent to the camera mounting assembly 10. The air duct 30 is configured to deliver an air flow to the shrouded space formed by the sealing member 28 in front of the camera assembly 12. A dedicated air duct 30 serving only the camera mounting assembly 10 and camera assembly 12 may also be used, approaching the camera mounting assembly 10 and camera assembly 12 from the area of the cowl or other structure 22 of the vehicle 16.

Thus, the present disclosure provides a camera mounting assembly that receives and retains a camera, such as a front facing camera, and that is attached to the cowl or other body structure of a vehicle, over which the dashboard is disposed. A cover structure is provided, integrated with or separate from the dashboard, that is disposed over this camera mounting assembly, hiding the camera assembly from the driver or operator. The cover structure may be formed as part of the valence panel of the top of the dashboard. The camera mounting assembly is thus disposed near the bottom of the windshield of the vehicle, within the reach of the windshield wipers, such that the camera's view of the environment may be maintained in inclement weather. This is especially helpful in commercial vehicles that utilize a large, substantially vertical windshield with limited windshield wiper reach. A seal is provided between the camera mounting assembly and/or cover structure and the windshield, thereby protecting the area around the camera from collecting dirt and debris and ensuring proper air flow across the windshield to reduce condensation that could impair camera visibility. A shroud is also provided around the camera that reduces the amount of stray light entering the camera imaging space and creating "ghost objects" in the images that the camera captures. Alternatively, a light absorbing material (e.g., flock tape) can be affixed to the camera mounting assembly for this purpose. No separate bracket glued or otherwise affixed to the windshield is required. The camera mounting assembly and the camera are in fluid communication with an air flow channel that is disposed through the cowl or other body structure of the vehicle, providing air flow and convection through the camera mounting assembly and to the camera, preventing temperature and condensation control problems that affect the camera's operation and vision. It will be readily apparent to those of ordinary skill in the art that the camera of the present disclosure may be replaced or supplemented by any other type of perception sensor as well, such as a radar sensor, a lidar sensor, etc., and/or any other type of sensor, such as a light sensor, a rain sensor, etc.

The present disclosure is illustrated and described herein with reference to illustrative embodiments and specific examples thereof. It will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A vehicle camera arrangement, comprising:
a camera mounting assembly coupled to a structure of a vehicle below the camera mounting assembly adjacent to a lower portion of a windshield of the vehicle, wherein the camera mounting assembly comprises a front cover plate adapted to be disposed adjacent to the lower portion of the windshield of the vehicle between the lower portion of the windshield and a camera assembly coupled to the camera mounting assembly and a sealing member disposed between a periphery of the front cover plate and the lower portion of the windshield of the vehicle, and wherein the front cover plate includes a port formed through the front cover plate adapted to receive an air duct passing through a lower portion of the camera mounting assembly and the structure of the vehicle below the camera mounting assembly and position an end of the air duct in a space between the lower portion of the windshield and the front cover plate through the front cover plate;
wherein the camera assembly is coupled to the camera mounting assembly having visibility through the front cover plate and the lower portion of the windshield of the vehicle.

2. The vehicle camera arrangement of claim 1, wherein the structure of the vehicle is associated with a dashboard of the vehicle.

3. The vehicle camera arrangement of claim 2, wherein the camera mounting assembly comprises a cover structure that is disposed through a valence panel of the dashboard of the vehicle.

4. The vehicle camera arrangement of claim 2, wherein the camera mounting assembly comprises a cover structure that is integrally formed with a valence panel of the dashboard of the vehicle.

5. The vehicle camera arrangement of claim 1, wherein the air duct is coupled to another air duct adapted to deliver a general air flow adjacent to the camera mounting assembly and the camera assembly and to the lower portion of the windshield of the vehicle disposed outside of the sealing member.

6. The vehicle camera arrangement of claim 1, wherein the camera mounting assembly comprises a top member, a bottom member, and a pair of side spanning members collectively disposed about the camera assembly.

7. A vehicle camera arrangement method, comprising:
coupling a camera mounting assembly to a structure of a vehicle below the camera mounting assembly adjacent to a lower portion of a windshield of the vehicle, wherein the camera mounting assembly comprises a front cover plate adapted to be disposed adjacent to the lower portion of the windshield of the vehicle between the lower portion of the windshield and a camera assembly coupled to the camera mounting assembly and a sealing member disposed between a periphery of the front cover plate and the lower portion of the windshield of the vehicle, and wherein the front cover plate includes a port formed through the front cover plate adapted to receive an air duct passing through a lower portion of the camera mounting assembly and the structure of the vehicle below the camera mounting assembly and position an end of the air duct in a space between the lower portion of the windshield and the front cover plate through the front cover plate; and
coupling the camera assembly to the camera mounting assembly providing camera visibility through the front cover plate and the lower portion of the windshield of the vehicle.

8. The vehicle camera arrangement method of claim 7, wherein the structure of the vehicle is associated with a dashboard of the vehicle.

9. The vehicle camera arrangement method of claim 8, wherein the camera mounting assembly comprises a cover structure that is disposed through a valence panel of the dashboard of the vehicle.

10. The vehicle camera arrangement method of claim 8, wherein the camera mounting assembly comprises a cover structure that is integrally formed with a valence panel of the dashboard of the vehicle.

11. The vehicle camera arrangement method of claim 7, wherein the air duct is coupled to another air duct adapted to deliver a general air flow adjacent to the camera mounting assembly and the camera assembly and to the lower portion of the windshield of the vehicle disposed outside of the sealing member.

12. The vehicle camera arrangement method of claim 7, wherein the camera mounting assembly comprises a top member, a bottom member, and a pair of side spanning members collectively disposed about the camera assembly.

13. A vehicle camera mounting assembly, comprising:
a top member;
a bottom member adapted to be coupled to a structure of a vehicle below the bottom member adjacent to a lower portion of a windshield of the vehicle;
a pair of side spanning members disposed between the top member and the bottom member;
a front cover plate adapted to be disposed adjacent to the lower portion of the windshield of the vehicle between the lower portion of the windshield and a camera assembly coupled to the vehicle camera mounting assembly; and
a sealing member adapted to be disposed between a periphery of the front cover plate and the lower portion of the windshield of the vehicle;
wherein the front cover plate includes a port formed through the front cover plate adapted to receive an air duct passing through the bottom member and the structure of the vehicle below the bottom member and position an end of the air duct in a space between the lower portion of the windshield and the front cover plate through the front cover plate;
wherein the top member, the bottom member, and the pair of side spanning members are collectively adapted to receive the camera assembly there between and provide the camera assembly with visibility through the front cover plate and the lower portion of the windshield of the vehicle.

14. The vehicle camera mounting assembly of claim 13, further comprising a cover structure that is one of disposed through a valence panel of a dashboard of the vehicle and integrally formed with the valence panel of the dashboard of the vehicle.

15. The vehicle camera arrangement of claim 1, wherein the air duct is adapted to deliver a dedicated air flow through the structure of the vehicle and the lower portion of the camera mounting assembly to a front portion of the camera mounting assembly and the lower portion of the windshield of the vehicle encompassed by the sealing member.

16. The vehicle camera arrangement method of claim 7, wherein the air duct is adapted to deliver a dedicated air flow through the structure of the vehicle and the lower portion of the camera mounting assembly to a front portion of the camera mounting assembly and the lower portion of the windshield of the vehicle encompassed by the sealing member.

17. The vehicle camera mounting assembly of claim 13, wherein the air duct is adapted to deliver a dedicated air flow through the structure of the vehicle and a bottom portion of the camera mounting assembly to a front portion of the camera mounting assembly and the lower portion of the windshield of the vehicle encompassed by the sealing member.

\* \* \* \* \*